United States Patent [19]

Braunschweig et al.

[11] Patent Number: 5,368,936

[45] Date of Patent: Nov. 29, 1994

[54] GRANULAR MATERIALS INCLUDING A CERAMIC COATING WHICH REDUCES DUSTING, METHOD OF PREPARING SAME AND METHOD OF REDUCING DUST GENERATION

[75] Inventors: Ehrich J. Braunschweig, Mendota Heights; Margaret M. Nauman, Hastings; Joseph Graham, Plymouth, all of Minn.

[73] Assignee: Minnesota Mining and Manufacturing Company, St. Paul, Minn.

[21] Appl. No.: 909,068

[22] Filed: Jul. 2, 1992

[51] Int. Cl.$^5$ ................................... B32B 9/00
[52] U.S. Cl. .................................... 428/403; 428/404; 428/405; 428/207; 428/325; 428/447; 428/454; 428/689; 427/215; 427/219; 427/314; 427/344; 427/376.2; 427/397.8
[58] Field of Search ............... 428/403, 404, 402, 454, 428/689, 405, 207, 325, 447; 427/219, 344, 397.8, 314, 215, 376.2; 156/89

[56] References Cited

U.S. PATENT DOCUMENTS

| | | | |
|---|---|---|---|
| 1,898,345 | 2/1933 | Denning | 428/404 |
| 2,273,827 | 2/1942 | Beasley | 91/70 |
| 2,591,149 | 4/1952 | Grove | 117/190 |
| 2,614,051 | 10/1952 | Buzzell et al. | 117/27 |
| 2,898,232 | 8/1959 | Miller et al. | 117/100 |
| 2,981,635 | 4/1961 | Lodge | 117/62 |
| 2,981,636 | 4/1961 | Lodge et al. | 117/70 |
| 2,998,328 | 8/1961 | Munger et al. | 117/70 |
| 3,977,888 | 8/1976 | Sano et al. | 106/74 |
| 4,263,048 | 4/1981 | Hacker | 106/84 |
| 4,990,278 | 2/1991 | Wyeth | 252/70 |
| 5,149,439 | 9/1992 | Birchall | 210/702 |

*Primary Examiner*—Patrick J. Ryan
*Assistant Examiner*—Marie R. Macholl
*Attorney, Agent, or Firm*—Gary L. Griswold; Walter N. Kirn; Jeffrey L. Wendt

[57] ABSTRACT

A granular material which includes an inorganic substrate has a ceramic coating which substantially reduces dust generation during processing of the granular material. The ceramic coating comprises the reaction product of an alkali metal silicate and an aluminosilicate, the ceramic coating further including a magnesium complex and an alkali metal chloride. The magnesium complex and alkali metal chloride are dispersed within the coating. It has been found that the use of magnesium chloride alone eliminates the use of oil in preventing dusting of the resultant granule material. Methods of producing such ceramic-coated granular materials are also disclosed, as well as methods of reducing dust generation using magnesium chloride.

13 Claims, No Drawings

GRANULAR MATERIALS INCLUDING A CERAMIC COATING WHICH REDUCES DUSTING, METHOD OF PREPARING SAME AND METHOD OF REDUCING DUST GENERATION

BACKGROUND OF THE INVENTION

1. Field of the Invention

The present invention relates to ceramic-coated inorganic granules having a remarkably reduced propensity to generate dust when processed, for example, into a roofing granule, and to methods for preparing same.

2. Description of Related Art

Methods have long been known for artificially coloring roofing granules (although roofing granules are discussed herein, the invention applies to any granular material having a ceramic coating). Roofing granules generally consist of crushed and screened substrate granules, in which the substrate granules are coated with a ceramic coating which may include a pigment. The coating is usually applied in the form of solution of a soluble silicate and a clay which partially or completely react together in the presence of heat to form an insolubilized ceramic coating. A chemical treatment (sometimes referred to in the art as "pickling") may be required if the temperature is too low, to ensure that a substantially water-insoluble coating is formed which is strongly adherent to the base granule. In carrying out these methods, the pigment is uniformly applied to the substrate granule surface with the soluble silicate solution.

One method of rendering the soluble silicate into an insoluble state by chemical action is by the addition of an acidic material to the soluble silicate solution, either before, during or after the application of the mixture of soluble silicate, clay, and pigment to the mineral granules. A chemical reaction between the acidic material and the alkaline portion of the silicate/clay reaction product "insolubilizes" the coating, and thus these chemicals are known in the art as insolubilization agents.

The processing of roofing granules into finished roofing panels currently requires the use of an oil coating on the granules in the process to control airborne particles of substrate and coating (particles range in size from 0.5 to about 30 micrometers) which are generated during processing. However, the addition of oil has a major disadvantage: an increase in the color difference between the color of the originally oiled granular material and the color after a given period of time. This is an especially important consideration in the manufacture of roofing granules. Oil eventually weathers off granules after a relatively short period of time and may result in a final granule color which is different than intended by the user.

The use of magnesium chloride ($MgCl_2$) as an insolubilization agent is disclosed in the following U.S. Pat. Nos.: 2,273,827; 2,591,149; 2,981,635; 2,981,636; 2,614,051; and 4,990,278.

In particular, the '149 patent discloses improving the weather resistance of colored mineral granules by providing a coating binder which comprises the reaction product of sodium silicate and a reactant such as cryolite ($Na_3AlF_6$), and a pigment. After heating, the coated granules are treated with an insolubilizing agent which reacts with the coating to form an insoluble color bearing coating. Aluminum chloride hexahydrate is listed as the preferred insolubilizing agent; however, the specification notes that it is possible to replace aluminum chloride with "other salts of a similar nature" such as magnesium chloride, aluminum nitrate, ferric chloride, or with an acid such as hydrochloric acid or nitric acid. The only example of the patent lists the use of 22 weight percent aqueous solution of aluminum chloride hexahydrate as the insolubilizing agent, or ten pounds aluminum chloride hexahydrate per ton of granules. There is no mention of dusting or dust reduction by using these insolubilizing agents.

The '636 patent describes a similar product and process, except the pigment is added all or partially with the insolubilizing agent to the surface of the roofing granules after the soluble silicate solution has been added thereto. The advantages claimed are the reduction in the amount of pigment used and that the granules do not have the dull, hazy characteristic of granules produced by prior methods, which may be magnesium oxide if magnesium chloride is used or other insoluble hydroxide. The preferred insolubilizing agent is listed as a mixture of aluminum chloride and ammonium chloride, but either may be used alone, and magnesium chloride, aluminum sulfate, zinc chloride, hydrochloric acid, etc., may be employed less satisfactorily. The chlorides are preferably sprayed on as a 10% solution, and the examples list use of from 1.5 to 4.0 pounds chloride per ton of granules. Again, there is no mention of dusting or dust reduction by use of these insolubilizing agents.

It would be advantageous if dust levels generated during processing could be controlled to a low level without the use of oil and its attendant problems.

SUMMARY OF THE INVENTION

The present invention provides a granular material, suitable for use as a roofing material, which does not require the use of oil to reduce the amount of dust generated by processing the granules. The granular material of the invention includes an inorganic substrate having a ceramic coating, the ceramic coating consisting essentially of the reaction product of an alkali metal silicate and an aluminosilicate, a magnesium complex, and an alkali metal chloride, the magnesium complex and alkali metal chloride dispersed within the coating. The magnesium complex is the reaction product of magnesium chloride and the alkali metal of the alkali metal silicate.

Preferably, the alkali metal chloride is present in an amount sufficient to give the granules an alkalinity of not less than about $-2.0$ but no more than about $+2.0$. It is also preferred that the alkali metal chloride and magnesium complex be present in quantities sufficient to give the granular material of the invention a dust generation value of not more than 500 particles per cubic centimeter. (Tests which define "alkalinity" and "dust value" are given in the Test Methods section.) More preferably, the alkali metal chloride and the magnesium complex are present in quantities sufficient to give said granules a dust value of not more than 100 particles per cubic centimeter.

The magnesium complex comprises magnesium, chlorine, oxygen, sodium and hydrogen, and forms upon the addition of magnesium chloride to the silicate coated granular materials when they are at a temperature ranging from about 150° C. to about 200° C., preferably about 175° C. to about 185° C. As used herein the term "magnesium complex" is intended to include the following constituents: although the exact chemical reactions have not been determined, it is theorized that magnesium chloride reacts, in the presence of water, with sodium ions to form $MgNa_2Cl_2(OH)_2.4H_2O$; magnesium hydroxide and unreacted magnesium chloride are also constituents of the magnesium complex. The magnesium chloride may be present in both nonhydrated and hexahydrate forms.

The method of making granular materials in accordance with the present invention comprises the steps of:
a) providing a slurry comprising an alkali metal silicate and an aluminosilicate, the aluminosilicate at least partially reactive with the alkali metal silicate;
b) coating the slurry onto a plurality of inorganic substrate granules to form a plurality of slurry-coated inorganic substrate granules;
c) heating the slurry-coated inorganic substrate granules for a time and at a temperature sufficient to form a plurality of ceramic-coated inorganic granules;
d) allowing the ceramic-coated inorganic granules to reach a temperature ranging from about 150° C. to about 200° C.; and
e) combining the ceramic-coated inorganic granules with an aqueous solution of magnesium chloride while the granules are at the temperature of step (d).

While not intending to be bound by any particular theory, it appears that the magnesium complex formed as above described, and further described herein, is responsible for the reduction in dusting while maintaining the alkalinity of the granular materials within specification. This is surprising because, according to the teachings of the reference patents discussed above, magnesium chloride and aluminum chloride are noted to be interchangeable for use as insolubilizing agents. The inventors herein have found this not to be true for the purpose of reducing dusting while maintaining the alkalinity specification, as may be seen in the examples.

Thus, another aspect of the invention is a method of reducing dust generation during processing of ceramic-coated inorganic granules, the method comprising treating inorganic granular material having an inorganic substrate and a ceramic coating with an aqueous magnesium chloride solution. The magnesium chloride treating is carried out while the granular material is at a temperature ranging from about 150° C. to about 200° C., and the magnesium chloride concentration of the aqueous solution and the amount of the solution are sufficient to provide not less than about 0.5 gm magnesium chloride per kg of inorganic substrate granules.

Further understanding of the advantages of the invention will be recognized by reading the description and examples which follow.

DESCRIPTION OF PREFERRED EMBODIMENTS

As used herein the term "granular material" is used broadly and is intended to mean particles having a diameter ranging from about 425 to about 1600 micrometers. The term "consisting essentially of" means that the coating on the inorganic substrate may include impurities and additives which do not detract from the ability of the coating to reduce dusting and maintain the alkalinity specification.

The inorganic substrate material of the granular materials of the invention are conventional and may be selected from any one of a rather wide class of relatively porous and non-porous weather resistant rock or minerals. Examples of relatively porous materials are trap rocks and slates. Examples of relatively non-porous rocks or minerals are argillite or greystone (such as the large greystone deposits located north of Wausau, Wis.), greenstone, certain granites and the like.

Aqueous sodium silicate is the preferred alkali metal silicate due to its availability and economy, although equivalent materials such as potassium silicate may also be used. The alkali metal silicate may be designated as $M_2O:SiO_2$, where M represents an alkali metal ion such as sodium ($Na^+$), potassium ($K^+$), mixture of sodium and potassium ions, and the like. The weight ratio of $M_2O$ to $SiO_2$ preferably ranges from about 1.4:1 to about 3.75. Weight ratios of 2.75:1 and 3.22:1 are particularly preferred, depending on the color of the granular material to be produced, the former preferred when light colored granules are produced, while the latter is preferred when dark granules are desired.

The aluminosilicate is preferably a clay having the formula $Al_2Si_2O_5(OH)_4$. Another preferred clay is kaolin, $Al_2O_3.2SiO_2.2H_2O$, and its derivatives formed either by weathering (kaolinite), by moderate heating (dickite), or by hypogene processes (nakrite). The particle size of the clay is not critical to the invention, however, it is preferred that the clay contain not more than about 0.5 percent coarse particles (particles greater than about 0.002 mm in diameter). Commercially available and useful aluminosilicate clays for use in the present invention are the aluminosilicates known under the trade designations "Dover", from W. R. Grace Company, McIntyre, GA., and "Sno-brite", from Evans Clay Company, also of McIntyre, GA.

The weight percent of magnesium chloride of the aqueous magnesium chloride solution used in the method of forming the ceramic coating may range from about 2.5 up to about 50, provided that the amount of solution having a given concentration may fluctuate to achieve the grams of magnesium chloride per kilogram substrate granules that is desired. Examples of preferred magnesium chloride sources are a 30 weight percent magnesium chloride solution available from Dow Chemical Company, Freeport, Tex.; a 30 weight percent magnesium chloride brine solution available from Great Salt Lake Minerals and Chemicals Corp., Odgen, Utah; a 64 weight percent magnesium chloride hexahydrate solution available from Mineral Research and Development Corporation, Freeport, Tex.; and a magnesium chloride hexahydrate powder available from Great Salt Lake Minerals and Chemicals Corporation, Ogden, Utah.

In preparing artificially colored granular materials in accordance with one preferred embodiment of the invention, a precolored granule may be treated with one of the above-described magnesium chloride solutions to reduce the dusting of the resulting granular materials. Typical precolored inorganic substrate granules include those known under the trade designations 3M Brand "5100" Series Roofing Granules, which are black kiln granules; a brown kiln product known under the trade designation 3M Brand "4100" Series Roofing Granules; and a white kiln product known under the trade designation 3M Brand "9300" Series Roofing Granules, all three available from Minnesota Mining and Manufacturing Company, St. Paul, Minn. ("3M").

Either precolored or "virgin" inorganic substrate granules may be colored with various pigments by including a pigment in the ceramic coating. Suitable pigments used in making the granular materials of the invention include red iron oxide, yellow iron oxide, titanium dioxide, chrome hydrate, chrome oxide, chrome green, ultramarine blue, phthalocyanine blue and green, carbon black, phthalocyanine green, metal ferrites, and mixtures thereof.

The use of a 2.5 to 50 weight percent magnesium chloride aqueous solution to treat ceramic-coated inorganic granules results in granular materials within the invention which require no oil or other chemical treatment for reducing the production of dust from roofing granules. Of all of the literature known to the inventors which provide formulations and methods for making pigmented roofing granules, the use of magnesium chloride in some fashion to complete the insolubilization of the silicate binder coating is known. However, the present invention addresses both insolubilization of the soluble silicate coating and dust control of the resulting granular materials during subsequent processing using a magnesium chloride treatment. The data provided in the examples which follow show in side by side comparison with a combined oil/AlCl$_3$ treatment that treatment with magnesium chloride in accordance with the invention provides a competent dust treatment for inorganic granules, without the attendant pollution control problems associated with the use of oil. Typical dust levels for granules treated with 4 grams oil per kg of granules average about 40 particles of dust per cubic centimeter of air. The inventors herein have found that a loading of about 4 grams magnesium chloride per kg of substrate granules controls dust level to about 37 particles per cubic centimeter. As a control, note that untreated white kiln products known under the trade designation 3M Brand "9300" Series Roofing Granules showed dust levels over 14,000 particles per cubic centimeter when not treated with oil/AlCl$_3$ or MgCl$_2$. Note also that when oil is used to reduce dusting, an auxiliary insolubilizing agent must be used, such as ammonium chloride or aluminum chloride, before application of oil to the granules. This addition of insolubilizing agent is required in prior processes to complete the insolubilization of the granule before the oil treatment. Such pretreatment is not necessary if magnesium chloride is used as taught in the present invention, which acts both to insolubilize the ceramic coating and to reduce the dusting levels of the resultant granular materials.

The granular materials of the present invention typically and preferably exhibit a lightness difference (L*) less than about 0.25 on a color tester known under the trade designation "CIELAB", available from the Hunter Corporation. Similar oil treated samples had L* differences between freshly oiled granules and aged granules between 1.0 to 2.0 on the same instrument. A value of L* of 1.0 or greater means that the difference in lightness is visually detectable and thus unacceptable.

The principles of the present invention may be applied to any silicate-based ceramic coating which has been fired between about 300° C. and 500° C. Further, although the intent of the invention was to eliminate oil treatment, it is feasible to oil treat the granular materials of the invention; however, there is no requirement to do so to reduce dusting. The granular materials of the invention may also have a silicone oil treatment to enhance the wicking of the pigment into the porous substrate granule, if desired, with or without the oil treatment, and granular materials having such an additive are considered within the scope of the invention as silicone oils are essentially chemically inert. A typical and preferred silicone oil is the organosiloxane silicone oil known under the trade designation "Tegosivin HL15M7", available from Goldschmidt Chemical, Hopewell, VI.

Method of Making Granular Materials of the Invention

In the method of making the granular materials of the invention, the steps of which are described in more detail in the examples, the first four steps are similar to those as described in U.S. Pat. No. 2,981,636, col. 5, lines 69-75, bridging col. 6, lines 1-16, with the exception of the use of magnesium chloride solution rather than aluminum chloride, and the use of temperatures mentioned hereinafter rather than 950°-1000° F. as used in that patent.

First, a slurry is formed at room temperature (about 25°C.) comprising an aluminosilicate, such as kaolin, an alkali metal silicate, such as sodium silicate solution, and optionally other additives and pigments. This slurry is applied to substrate granules which are at a temperature ranging from about 150° C. to about 200° C., preferably about 180° C., in a mixer such as a tumbling-barrel type of mixer.

The granules and slurry are then mixed for several minutes until the granules are evenly coated with the slurry, and then the slurry-coated substrate granules are dried with warm air until they have a free flowing consistency.

The coated granules are then fired in a kiln, preferably a rotary kiln, at a temperature ranging from about 300° C. to about 550° C., more preferably from about 350° C. to about 500° C., to react the silicate and aluminosilicate.

The warm, ceramic-coated granules are then deposited in a shaker, where an aqueous magnesium chloride solution is immediately added to the granules as they are being shaken, the water flashing off due to the temperature (about 180° C.) of the fired granules. Optionally, after one minute any oil and/or silicone treatments may be added to the samples. The coated granules are shaken for a total of approximately 4 minutes, removed from the shaker, boxed, and allowed to cool prior to testing and processing.

The invention will be further described with reference to the following Test Methods and Examples. In the following Examples, all parts, percentages, are by weight unless otherwise specified.

TEST METHODS

Alkalinity Test

This test provided a measure of the unbound, soluble alkali metal content remaining in a ceramic coating made from reacting an alkali metal silicate and an aluminosilicate clay. The silicate binder reacts (when calcined at temperatures preferably between 350° C. and 500° C.) with an aluminosilicate clay, and the reaction product forms a water insoluble ceramic coating (reaction 1). In the present invention, an aqueous MgCl$_2$ solution is added to the granules coated with the product of reaction1, and reactions 2 and 3 occur at a temperature of about 180° C.:

$$3Na_{(aq)}^+ + MgCl_2 \rightarrow 2NaCl + Mg_{(aq)}^{2+} + Na_{(aq)}^+ \qquad (2)$$

$$Na_{(aq)}^+ + 2Cl_{(aq)}^- + Mg_{(aq)}^{2+} \rightarrow \text{magnesium/sodium/chloride/water complex} \qquad (3).$$

The remaining soluble alkali metal (mostly typically in the form of NaCl or other alkali metal chloride) is an indirect measure of the extent of insolubilization of the ceramic coating.

For each test run, 100 grams of the granular materials to be tested were placed into 100 ml water in an Erlenmeyer flask. The water was brought to boil and boiled for a period of 5 minutes. 3 drops of phenolphthalein indicator (turning point pH=9) were added anytime during the 5 minutes. The 100 ml of boiling water was decanted into a second flask. Approximately 10 ml of fresh distilled water was then added onto the granules and swirled, and this 10 ml of water then added to the second flask with the original 100 ml that had already been decanted.

The 110 ml of decanted water was then titrated to end-point using a digital buret titration device commercially available from Brinkmann Instruments, Westbury, N.Y. If the solution was pink immediately after addition of the indicator, that indicated the solution had a pH above 9.0, so the solution was titrated with acid, (hydrosulfuric acid (0.1N)). If the solution was not pink immediately after addition of the indicator, the solution had a pH less than 9.0, and thus needed to be titrated to end-point using a base, (0.1N NaOH).

The ml (or cc) of acid or base required to reach end-point is called the "Alkalinity". The alkalinity is positive when using acid, negative when using base. To clarify this procedure, the following theoretical examples are offered:

Theoretical Example 1
100 grams of granular materials are prepared as above. The decanted solution is pink, and 1.4 ml of hydrosulfuric acid is added to the solution to reach end-point (end-point is reached when the phenolphthalein indicator turns color from pink to clear).
The alkalinity for this sample is +1.4.

Theoretical Example 2
100 grams of granular materials are prepared as above. The decanted solution is clear, and requires 0.5 ml of NaOH to make the solution turn pink, thereby indicating end-point.
The alkalinity of this sample is −0.50

For granular materials of the invention, any alkalinity result between −2.0 and +2.0 is acceptable. In general, alkalinity values that are less than 0.2 units apart are considered to be essentially the same value.

Dust Generation Measurement

Granular materials of the invention, when processed into roofing granules or other end products, have small particles associated with them (or generated from them that) are not chemically or physically bonded to the roofing granule coating or substrate. The small particles originate from both the coating and the substrate, and become easily airborne during material handling procedures. "Airborne dust", for the purposes of this invention, is defined as any particle between 0.5 micrometer and 30 micrometers in diameter. This test quantified the dusting for samples of granular materials.

The testing equipment used to measure airborne dust contained in a sample of granular material consisted of a dust generation machine known under the trade designation "APS 3310" Aerodynamic Particles Sizer Analysis System and associated hardware and software, available from TSI, Inc. The system included a diluter known under the trade designation "APS 3302" which allowed reduction of the particle concentration. The diluter allowed dilution ratio of 20:1 to be used, at a total flow rate of 5 standard liters per minute. The diluter operates in a closed system where a small sample of the air from the sample is diluted with filtered air from the original sample. With the closed system, the integrity of the sample is upheld by maintaining the same temperature and, relative humidity, and elemental composition throughout.

The machine is designed specifically to measure concentration of airborne dust particles using laser refraction. The sample granules and accompanying dust and dilution air fall through a laminar flow capillary tube (partially by gravity and partially under the influence of the particle size analyzer) which is placed below the sample inlet. Flowrate is monitored by the pressure drop across the capillary tube. Optical fibers oppose each other across the capillary tube, and when the laser beam is broken as the sample falls through, a signal is sent (through a signal processor known under the trade designation "Opto 22", from Optomux Corp.) to an International Business Machines Corporation computer known under the trade designation "PS/2 Model 50", which reports, using programmed software from TSI., Inc., concentration of particles in "particles/cc" of air. The optical fibers, laser, and associated equipment were available from Banner Engineering Corp.

200 grams of roofing granules to be tested were weighed and put into the dust generator. The dust generator then measured airborne dust particles for 25 seconds, and reported the total concentration of particles ranging in size from 0.5 to 30 micrometers.

In general, for non-white samples prepared or treated in the laboratory, dust levels are preferably below 100 particles/cc. In general, dusting values closer than 10 particles/cc, especially when the dusting values are under 10, are considered to be essentially the same.

MATERIALS DESCRIPTION

The following materials are used in the Examples which follow:

$MgCl_2$ 30 wt % Water Solution, available from Dow Chemical Company, Freeport, Tex.;

$MgCl_2$ Brine 30 wt % Water Solution, available from Great Salt Lake Minerals & Chemicals Corporations, Odgen, Utah;

$MgCl_2$ 64 wt % Hexahydrate Water Solution, available from Mineral Research & Development Corporation, Freeport, Tex.; $MgCl_2$ powder hexahydrate, available from Great Salt Lake Minerals & Chemicals Corporations, Odgen, Utah "Tegosivin HL15M7" is an organosiloxane silicone oil, available from Goldschmidt Chemical, Hopewell, Va.;

slate oil, available from Cross Oil & Refining Co. Inc., Smackover, Ariz.;

$AlCl_3$ 32° Be Solution is available from Reagent Chemical & Research, Tex.;

3M Brand "5100" Series Roofing Granules, black, kiln product, available from 3M Corona Plant, Corona, Calif.;

3M Brand "4100" Series Roofing Granules, brown, kiln product, available from 3M Industrial Mineral Products Division Pilot Plant, St. Paul, Minn.;

0.1N Hydrosulfuric Acid, available from American Scientific Products, Minneapolis, Minn.; and 0.1N NaOH, available from American Scientific Products, Minneapolis, Minn.

PROCEDURE FOR TREATING GRANULES TO REDUCE DUST GENERATION

The procedure used in the following examples for synthesizing the granular materials of the invention and the comparative examples was as follows:

1) kilned granules were measured into 500 gram samples;
2) each 500 gram sample was heated in an oven in an air atmosphere to 182° C. and held at that temperature for at least 2 hours;
3) the heated samples were removed from oven and immediately placed in a mechanical shaker, which was then turned on;
4) $MgCl_2$ solution (within the invention) or $AlCl_3$ solution (without the invention) treatments were diluted in 7.5 ml of distilled water, and added to sample immediately;
5) after 1 minute of shaking, any oil and/or silicone treatments were added to sample;
6) the treated granules were allowed to shake for a total of exactly 4 minutes; and
7) samples were removed from the shaker, boxed, and allowed to cool overnight.

EXAMPLES

Examples 1-5

Effects of Different weight percent of $MgCl_2$ on Dusting and Alkalinity

For this set of examples, all $MgCl_2$ solutions were made using a 64% $MgCl_2$ hexahydrate powder (i.e., 64 weight percent $MgCl_2$), available from Great Salt Lake Minerals & Chemicals Corp.

All Examples 1-5 were prepared by the procedure described above using precolored 3M Brand "4100" Series Roofing Granules. The dusting and alkalinity results are presented in Table 1.

TABLE 1

| Example | $MgCl_2$ Solution (Wt % $MgCl_2$) | gm solution/ 500 gm granules | gm $MgCl_2$/Kg granules | Dusting (part/cc) | Alkalinity (cc) |
|---|---|---|---|---|---|
| 1 | 5% | 30 | 3 | <10 | −0.3 |
| 2 | 10% | 15 | 3 | <10 | −0.1 |
| 3 | 20% | 7.5 | 3 | <10 | +0.1 |
| 4 | 30% | 5 | 3 | <10 | +0.1 |
| 5 | 40% | 3.75 | 3 | <10 | +0.2 |

Dusting
For all Examples 1-5, dusting was below 10 particles/cc, thereby allowing the conclusion that all wt % of $MgCl_2$ solutions reduce dusting to acceptable levels if applied in an amount to achieve the same grams $MgCl_2$ per kg substrate granules.

Alkalinity
The most effective wt % was at the low concentrations ranging between 5% and 10% $MgCl_2$. At higher $MgCl_2$ concentrations (20%-40%), the alkalinities were about the same.

Examples 6-9

Effect of different forms of $MgCl_2$ on Dusting and Alkalinity

The materials used in these examples were described in the "Materials" section above. All forms of $MgCl_2$ were prepared into a 30% wt $MgCl_2$ solution.

Examples 6-9 were prepared by the standard procedure described earlier using precolored 3M Brand "4100" Series Roofing Granules. The dusting and alkalinity results are presented in Table 2.

TABLE 2

| Example | Type of $MgCl_2$ | Wt % | gm $MgCl_2$/ Kg granules | Dusting (part/cc) | Alkalinity (cc) |
|---|---|---|---|---|---|
| 6 | Brine | 30% | 3 | <10 | −0.8 |
| 7 | Solution | 30% | 3 | <10 | −0.2 |
| 8 | Powder | 30% | 3 | <10 | +0.1 |
| 9 | Hexahydrate | 30% | 3 | <10 | +0.1 |

Dusting
This series of Examples showed that the form of $MgCl_2$ used to treat roofing granules does not effect dusting of the resulting granules, all being within acceptable range.

Alkalinity
The $MgCl_2$ brine solution tested produced granules exhibiting an alkalinity closest to being not acceptable than did the other $MgCl_2$ forms, which gave essentially the same results, indicating that the brine form of $MgCl_2$ did effect alkalinity more than the other forms but is still acceptable.

Example 10 and Comparative Examples A and B

Effects of silicone treatments on dusting and alkalinity

Comparative Examples A and B were prepared by the standard procedure described above using precolored 3M Brand "4100" Series Roofing Granules, except that for Comparative Example A, a 30% $AlCl_3$ solution made by Reagent Chemical & Research, organosiloxane silicone made by Goldschmidt, and slate oil were used in combination to control dusting. For Comparative Example B, slate oil alone was used to control dusting. Example 10 utilized a 30% $MgCl_2$ solution made by Dow Chemical. The dusting and alkalinity results are presented in Table 3.

TABLE 3

| Example | Conditions | Dusting | Alkalinity |
|---|---|---|---|
| Comp. Ex. A | A conventional treatment for roofing granules, consisting of 1 gm $AlCl_3$/kg granules, 3 gm oil/kg granules, and 0.06 gram/kg silicone | <10 | −1.6 |
| Comp. Ex. B | A conventional treatment for roofing granules, consisting of 1 gm $AlCl_3$/kg granules | <10 | −1.6 |
| Ex. 10 | A treatment for roofing granules using 3 gm $MgCl_2$/Kg granules | <10 | +0.2 |

Dusting
In these examples the dusting levels were all essentially equal and acceptable below 10 particles/cc. The silicone treatments had little or no effect on dust generation.

Alkalinity
Alkalinity values for Example 10 and Comparative Examples A and B were acceptable. The addition of the organosiloxane silicone oil did not affect the alkalinity.

Example 10 is an example of a new granular material that does not require oil or AlCl₃ to have acceptable dusting and alkalinity characteristics.

Examples 11–15 and Comparative Example C

Affect of Different $MgCl_2$ Loading on Dusting and Alkalinity

This set of examples were prepared as described above by the standard procedure, using black 3M Brand "5100" Series Roofing Granules, and the 30 wt % $MgCl_2$ solution from Dow Chemical. The $MgCl_2$ loadings, dusting and alkalinity results for Examples 11–15 and Comparative Example C are listed in Table 4.

TABLE 4

| Example | gm MgCl2/ kg granules | dusting (part/cc) | alkalinity (cc) |
|---|---|---|---|
| Comp Ex. C | 0 | 4960 | +3.8 |
| 11 | 1 | <10 | −0.4 |
| 12 | 2 | 14 | +0.2 |
| 13 | 4 | <10 | +0.2 |
| 14 | 6 | <10 | +0.3 |
| 15 | 8 | 11 | +0.3 |

Dusting
From 1 to 8 gm $MgCl_2$/kg granules, dusting levels were all essentially equal and acceptable at or near 10 particles/cc. The $MgCl_2$ was able to control dust even at low loadings. As a comparison, the Comparative Example C exhibited dust levels of almost 5000 particles/cc, which was not acceptable.

Alkalinity
From 2 to 8 gram $MgCl_2$/kg granules, the alkalinity remained constant at or near +0.3 cc. At $MgCl_2$ concentration of 1 gm $MgCl_2$/Kg granules, the alkalinity was negative, thereby indicating that insolubilization of the coating was better. For all of Examples 11–15, alkalinities were completely acceptable for roofing granule production. As a comparison, Comparative Example C had an alkalinity of 3.8, which was not acceptable.

Examples 11–15 are examples of new roofing granules that do not require any oil or AlCl₃ and exhibit acceptable dusting and alkalinity levels by the use of $MgCl_2$ only.

Comparative Examples D–J

Affect of AlCl₃ on Insolubilization, Dusting, and Alkalinity

Comparative Examples D–J were prepared by the standard procedure described earlier, using black 3M Brand "5100" Series Roofing Granules and a 30% AlCl₃ solution made by Reagent Chemical & Research. Table 5 lists the loadings of AlCl₃, and the resulting dusting and alkalinity values.

TABLE 5

| Comp. Ex. | gm AlCl3/ kg granules | Dusting (part/cc) | Alkalinity (cc) |
|---|---|---|---|
| D | 0 | 4960 | +3.8 |
| E | 0.5 | 1950 | +1.5 |
| F | 1.0 | 1380 | +0.3 |
| G | 1.5 | 337 | −0.5 |
| H | 2.0 | 173 | −2.9 |
| I | 2.5 | 344 | −6.4 |
| J | 3.0 | 471 | −7.9 |

Dusting
For cases between 0 and 1.5 gm AlCl₃/kg granules, dusting was high and unacceptable, being well above 500 particles/cc.

Alkalinity
For 0.5–1.5 gm AlCl₃/kg granules, alkalinity was acceptable; however, above 1.5 gm AlCl₃/kg granules, the alkalinity was out of the acceptable range. Based on the alkalinity data, it is evident that AlCl₃ and $MgCl_2$ do not perform the same, and could not be interchanged for each other on a gram for gram basis. Based on the dusting data, again it is evident that AlCl₃ and $MgCl_2$ do not perform the same. $MgCl_2$ gives constant dust results well below 10 particles/cc while AlCl₃ gives much higher (unacceptable) results.

Comparative Examples K–O and F

Effect of Oil and AlCl₃ on Dusting and Alkalinity

Comparative Examples K–O and F were prepared as described above by the standard procedure using black 3M Brand "5100" Series Roofing Granules treated with 30 wt % AlCl₃ solution made by Reagent Research and Chemicals at 1 gram AlCl₃/kg granules. The composition of Comparative Examples K–O and F, and the dusting and alkalinity values, are given in Table 6.

TABLE 6

| Comp. Ex. | gm AlCl3/ kg granules | gm oil/ kg granules | Dusting (part./cc) | Alkal. (cc) |
|---|---|---|---|---|
| F | 1 | 0 | 1380 | +0.3 |
| K | 1 | 2 | <10 | +0.2 |
| L | 1 | 3 | <10 | +0.2 |
| M | 1 | 4 | <10 | +0.4 |
| N | 1 | 6 | <10 | +0.2 |
| O | 1 | 8 | <10 | +0.2 |

Dusting
2–8 gm oil/kg granules achieved the same results in dusting levels (all below 10 particles/cc). As comparison, the "5100" Series Roofing Granule treated with 1 gm AlCl₃/kg of granules had unacceptable dusting level (almost 1400 particles/cc). This data shows that $MgCl_2$ acts much as oil for reducing dusting.

Alkalinity
At all oil levels, the alkalinity at 1 gm AlCl₃/kg granules remained constant (at or near +0.2 cc).

BEST MODE FOR THE INVENTION

Examples 16 and 17 were roofing granules that had acceptable dusting and alkalinity characteristics. Examples 16 and 17 are compared with traditional formulations utilizing AlCl₃ and slate oil to produce acceptable granules (Comparative Examples M and N).

Example 16

The granular material of this example was 1000 gm of 3M Brand "5100" Series Black Roofing Granules, kiln product fired at 371° C., treated with 1–6 gram of 30 wt % $MgCl_2$ solution per kg of substrate granule, as per the general procedure described above. A small amount of organosiloxane silicone oil was also added.

Comparative Example M

Comparative Example M was 1000 gm of 3M Brand "5100" Series Black Roofing Granules, kiln product fired at 371° C., treated with 1 gram 32° Be AlCl₃ per kg of substrate granules, 2–8 grams slate oil, and a small amount of organosiloxane silicone oil.

Example 17

The granular material of this example was 1000 gm of 3M Brand "4100" Series Brown Roofing Granules, kiln product fired at 443° C., treated with 1–3 grams of 30 wt % $MgCl_2$ solution per kg of substrate granule, as per the general procedure described above. A small amount of organosiloxane silicone oil was also added.

Comparative Example N

Comparative Example N was 1000 gm of 3M Brand "4100" Series Brown Roofing Granules, kiln product fired at 443° C., treated with 1 gram 32° Be $AlCl_3$ per kg of substrate granules, 3 grams slate oil, and a small amount of organosiloxane silicone oil.

Various modifications and alterations of this invention will become apparent to those skilled in the art without departing from the scope of this invention, and it should be understood that this invention is not to be unduly limited to the illustrated embodiments set forth herein.

What is claimed is:

1. A granular material comprising an inorganic substrate and a ceramic coating, said ceramic coating consisting essentially of a product of a first reaction, a product of a second reaction, and a product of a third reaction, said first reaction being between an aluminosilicate and a plurality of alkali metal ions derived from an aqueous alkali metal silicate, said first reaction occurring at a temperature ranging from about 350° C. to about 500° C. and in the presence of a molar excess of said alkali metal ions, said product of a second reaction being a magnesium/sodium/chlorine/water complex and said product of a third reaction being an alkali metal chloride, said second and third reactions occurring in the presence of water and in the presence of at least 0.5 gram $MgCl_2$ per kilogram of said inorganic substrate, said inorganic substrate coated with said product of said first reaction being at a temperature ranging from about 150° C. to about 200° C. during contact with said $MgCl_2$ and said water, a first portion of said $MgCl_2$ reacting with a first portion of said molar excess of alkali metal ions and with said water to form said complex, wherein a remaining portion of said $MgCl_2$, a remaining portion of said molar excess of alkali metal ions, the complex and the alkali metal chloride are all dispersed within the ceramic coating, and wherein said alkali metal chloride is present in an amount sufficient to give said granular material an alkalinity of not less than about −2.0 but no more than about +2.0, and said alkali metal chloride and said complex are present amounts sufficient to render a dust value of not more than about 500 particles per cubic centimeter.

2. A granular material in accordance with claim 1 wherein said alkali metal chloride and said complex are present in quantities to give said granular material a dust value of not more than about 100 particles per cubic centimeter.

3. A granular material in accordance with claim 1 wherein said coating further includes a pigment.

4. A granular material in accordance with claim 3 wherein said pigment is selected from a group consisting of carbon black, titanium dioxide, chrome oxide, yellow iron oxide, phthalocyanine green, red iron oxide, metal ferrites, and mixtures of these.

5. A granular material in accordance with claim 1 wherein said alkali metal silicate comprises $Na_2O:SiO_2$ having a weight ratio of $Na_2O$ to $SiO_2$ ranging from about 1.4:1 to about 3.75:1.

6. A granular material in accordance with claim 1 which further includes a silicone oil.

7. A method of making a granular material which includes an inorganic substrate and a ceramic coating, said method comprising the steps of:
   a) providing a slurry comprising an alkali metal silicate and an aluminosilicate, the aluminosilicate at least partially reactive with the alkali metal silicate;
   b) preheating a plurality of inorganic substrate granules to a temperature ranging from about 150° to about 200° C. to form a plurality of preheated inorganic substrate granules
   c) coating the slurry onto said plurality of preheated inorganic substrate granules to form a plurality of slurry-coated inorganic substrate granules;
   d) heating the slurry-coated inorganic substrate granules at a temperature ranging from about 300° to about 550° C. for a time sufficient to form a plurality of ceramic-coated inorganic substrate granules;
   e) cooling the ceramic-coated inorganic substrate granules to a temperature ranging from about 150° C. to about 200° C.; and
   f) combining the ceramic-coated inorganic substrate granules with an aqueous solution of magnesium chloride while the ceramic-coated inorganic substrate granules are at the temperature of step (d), the aqueous solution provided in an amount sufficient to give said granular material an alkalinity of not less than about −2.0 but no more than about +2.0, and a dust value of not more than about 500 particles per cubic centimeter.

8. Method in accordance with claim 7 wherein said temperature of step (c) is between about 350° C. and 500° C.

9. Method in accordance with claim 7 wherein said alkali metal silicate comprises $Na_2O:SiO_2$ having a weight ratio of $Na_2O$ to $SiO_2$ ranging from about 1.4:1 to about 3.75:1.

10. Method in accordance with claim 9 wherein said alkali metal silicate comprises $Na_2O:SiO_2$ having a weight ratio of $Na_2O$ to $SiO_2$ of about 2.75:1.

11. Method in accordance with claim 9 wherein said alkali metal silicate comprises $Na_2O:SiO_2$ having a weight ratio of $Na_2O$ to $SiO_2$ of about 3.22:1.

12. The product made by the process of claim 7.

13. A method of reducing dust generation during processing of ceramic-coated inorganic substrate granules, the method comprising treating ceramic-coated inorganic substrate granules with an aqueous magnesium chloride solution to form treated granules, the magnesium chloride treating being carried out while the ceramic-coated inorganic substrate granules are at a temperature ranging from about 150° C. to about 200° C., and the magnesium chloride concentration of the aqueous solution and the amount of the solution are sufficient to provide not less than about 0.5 gm magnesium chloride per kg of said ceramic-coated inorganic substrate granules, the aqueous solution provided in an amount sufficient to give said treated granules an alkalinity of not less than about −2.0 but no more than about +2.0, and a dust value of not more than about 500 particles per cubic centimeter.

* * * * *